April 5, 1932.  E. W. SEEGER  1,851,989
ELECTRICAL GENERATING SYSTEM
Filed Nov. 4, 1929
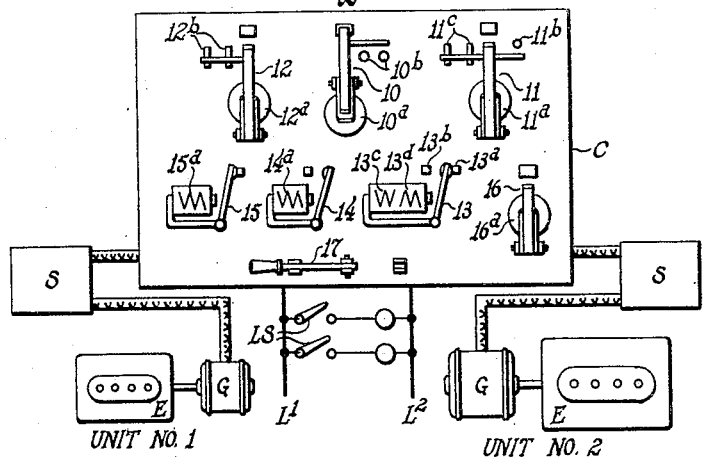
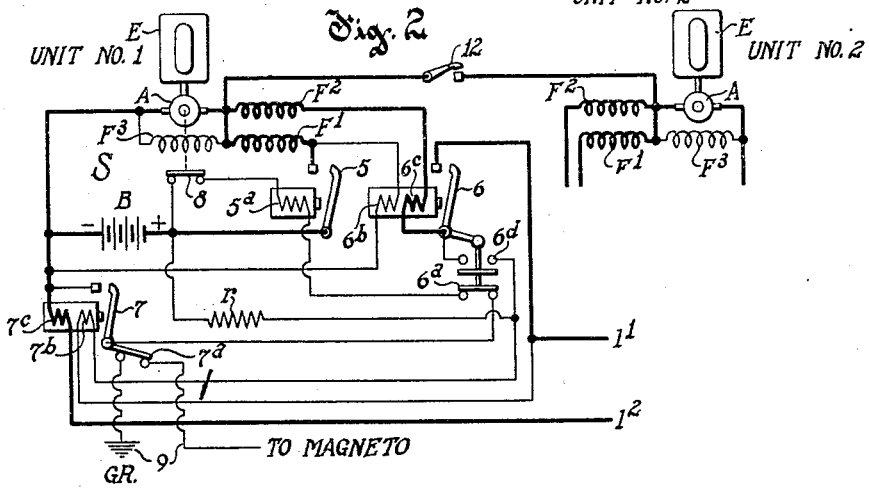
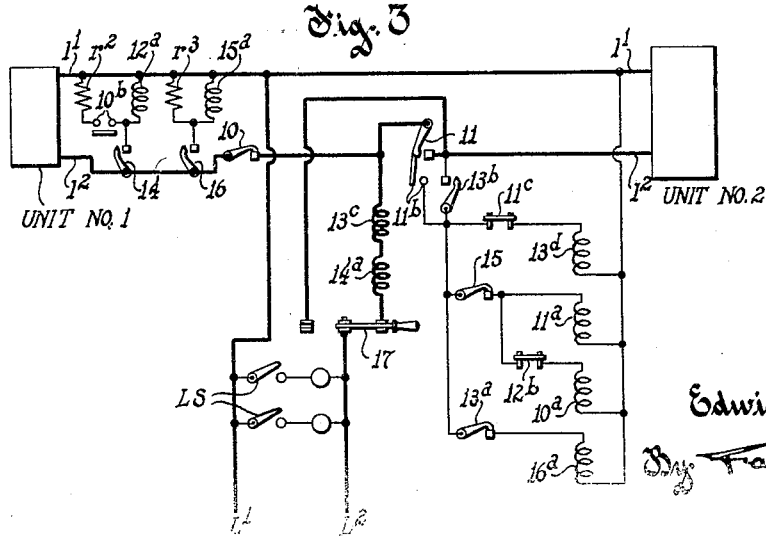
Inventor
Edwin W. Seeger Patented Apr. 5, 1932

1,851,989

UNITED STATES PATENT OFFICE

EDWIN W. SEEGER, OF WAUWATOSA, WISCONSIN, ASSIGNOR TO CUTLER-HAMMER, INC., OF MILWAUKEE, WISCONSIN, A CORPORATION OF DELAWARE

ELECTRICAL GENERATING SYSTEM

Application filed November 4, 1929. Serial No. 404,725.

This invention relates to electrical generating systems.

The invention relates more particularly to generating systems in which a plurality of gas engine driven units are employed for supplying current to a single load circuit.

In the copending application of Edwin X. Schmidt and Walter O. Baer, Serial No. 404,488 filed Nov. 11, 1929, now Patent No. 1,796,810, there is disclosed an automatic generating system employing two generating units of different capacities. The smaller generator unit is automatically controlled to supply current to the load circuit under light load conditions while the larger generator unit is automatically controlled to supply current to the load circuit when the current demand exceeds the capacity of the smaller generator unit. In this system the small generator unit is operative only under light load conditions and the maximum capacity of the generating system is determined by the generating capacity of the large generating unit.

In some systems the small generating unit has considerable generating capacity and by providing for parallel operation of the generator units the capacity of the system can be materially increased.

The present invention has among its objects to provide an automatic controller for systems of the aforesaid character which provides for operation of each of the generator units alone under certain load conditions and for parallel operation thereof under other load conditions.

Various other objects and advantages of the invention will hereinafter appear.

The accompanying drawings illustrate a generating system embodying the invention which will now be described, it being understood that the system illustrated is susceptible of modification without departing from the spirit and scope of the appended claims.

In the drawings:

Figure 1 schematically illustrates an automatic control system embodying the invention;

Fig. 2 diagrammatically illustrates a preferred form of starter which is employed in connection with each of the gas engine driven units shown in Fig. 1, and Fig. 3 is an across-the-line diagram illustrating the circuit connections of certain of the control elements shown in Fig. 1.

Referring to Fig. 1, the same illustrates a small generator unit 1 and a large generator unit 2, each of which includes a generator G and an internal combustion engine E for driving the same. Each of said units is provided with a starter S and as hereinafter set forth a controller C cooperates with the starters S to control said units in the following manner. The small generator unit 1 is rendered operative to supply current to the service mains $L^1$—$L^2$ under light load conditions and when the current demand exceeds the capacity of the small generator unit 1 but is within the capacity of the large generating unit 2 the latter unit is rendered operative to supply current to said mains and the smaller generator unit is stopped. When the current demand exceeds the capacity of the large generator unit the generator units are operated in parallel to supply current to said mains.

Generators G of units 1 and 2 are of the same type, and as shown in Fig. 2 each is provided with an armature A, series field windings $F^1$ and $F^2$ and a shunt field winding $F^3$. The starters S of units 1 and 2 are of the same type, and in Fig. 2 one of the starters is illustrated in connection with the small generator unit 1. Said starter includes a starting switch 5 and a main switch 6. Starting switch 5 provides for connection of the generator to a storage battery B for operation thereof as a motor for cranking of the engine, and as hereinafter set forth said starting switch is controlled through the medium of a normally open relay 7, a normally closed governor operated switch 8 and normally closed auxiliary contacts $6^a$ associated with main switch 6. Relay 7 is provided with normally closed auxiliary contacts $7^a$ for controlling a magneto ground circuit 9 for the engine, and said relay is provided with a shunt winding $7^b$ and a series winding $7^c$. Main switch 6 provides for connection of generator G to mains $l^1$ and $l^2$ and the same is provided with a shunt winding $6^b$ and a series winding $6^c$. Main switch 6 is also provided with normally open auxiliary contacts $6^d$ for establishing a charging circuit for battery B through a resistance $r$.

The above described starter functions and operates in the following manner. An automatic start is made by connecting a load across the mains $l^1$—$l^2$. Upon connection of a load across said mains circuit is established from the negative side of battery B through the series winding $7^c$ of relay 7 to main $l^2$, thence through the load to main $l^1$ through the shunt winding $7^b$ of relay 7 and through resistance $r$ to the positive side of battery B. Winding $7^b$ effects response of relay 7 and said relay in responding removes the ground connection GR from the magneto of the engine and establishes an energizing circuit for starting switch 5 extending from the negative side of battery B through relay 7 through auxiliary contacts $6^a$ associated with main switch 6 through the winding $5^a$ of starting switch 5 and through the governor operated switch 8 to the positive side of battery B. Starting switch 5 in responding establishes a circuit extending from the left hand terminal of armature A through battery B through switch 5 and through the series field $F^1$ to the right hand terminal of said armature. The generator G then operates as a motor to crank the engine E.

It will be observed from Fig. 2 that the winding $6^b$ of main switch 6 is connected across the armature A and series field winding $F^1$ and when the engine functions to drive the generator, current is supplied to said winding to effect response of main switch 6. Main switch 6 in responding interrupts the aforedescribed energizing circuit for starting switch 5 extending through auxiliary contacts $6^a$ and establishes circuit from the right hand terminal of the armature A through series field winding $F^2$ through winding $6^c$ to main $l^1$ whereby the load connected across mains $l^1$—$l^2$ is supplied with current by generator G. Also upon response of main switch 6 the auxiliary contacts $6^d$ thereof establish a charging circuit for battery B through the medium of resistance $r$. Winding $6^c$ holds main switch 6 in closed position as long as a load is connected across main $l^1$—$l^2$ and upon removal of such load said winding is deenergized to permit opening of main switch 6.

As aforestated starting switch 5 is energized through the medium of the governor operated switch 8. When the generator operates at a speed in excess of its cranking speed switch 8 opens to interrupt the energizing circuit for starting switch 5. Thus should the load be removed from mains $l^1$—$l^2$ and reconnected thereto before the engine speed is reduced below cranking speed, the open governor switch 8 prevents closing of the motor starting circuit unnecessarily and so avoids a direct connection between the battery and the generator terminals while the generator is developing its higher voltage.

From the foregoing it will be observed that the starter illustrated in Fig. 2 provides for automatic starting of the generator unit upon connection of a load across the supply mains and for automatic stopping thereof upon removal of the load.

The controller C shown in Fig. 1 includes electro-responsive transfer switches 10 and 11 and an equalizing switch 12. Switch 10 is normally closed and provides for connection of service main $L^2$ to main $l^2$ of the small generator unit 1 while switch 11 is normally open and is responsive to connect service main $L^2$ to main $l^2$ of the large generator unit 2. Switch 12 is normally open and is adapted as hereinafter set forth to establish an equalizing connection between the generators of the two units during parallel operation thereof. Controller C also includes relays 13, 14, 15 and 16 and a knife switch 17.

For purposes hereinafter set forth switch 10 is provided with normally open auxiliary contacts $10^b$ and transfer switch 11 is provided with normally open auxiliary contacts $11^b$ and normally closed auxiliary contacts $11^c$. Contacts $11^c$ are arranged to open only upon closure of switch 11. Also for purposes hereinafter set forth switch 12 is provided with normally closed auxiliary contacts $12^b$ which are arranged to open only upon closure of said switch.

Also as shown in Fig. 1 relay 13 is provided with normally closed contacts $13^a$ and normally open contacts $13^b$ and the same is provided with a series operating winding $13^c$ and a shunt holding winding $13^d$. Relays 14 and 16 are normally open and relay 15 is normally closed and each of said relays has a winding "$a$" associated therewith for effecting response thereof.

The function and operation of controller C and the circuit connections therefor will now be more fully described in connection with Fig. 3. As shown in this figure the mains $l^1$ of units 1 and 2 are permanently connected to service main $L^1$ and with knife switch 17 in its right hand position, service main $L^2$ is connected to main $l^2$ of the small generating unit 1 through the medium of transfer switch 10 and the windings $13^c$ and $14^a$ of relays 13 and 14. It will thus be apparent that if one of the switches LS is closed to connect a load across service mains $L^1$—$L^2$ the small generator unit 1 will be automatically started as described in connection with Fig. 2 to supply current to the load. The small generator unit remains in operation as long as the load across the service mains $L^1$—$L^2$ does not exceed the capacity of said unit.

When the load connected across service mains $L^1$—$L^2$ exceeds the capacity of the small generator unit 1 relay 13 responds under the action of its operating winding $13^c$. Upon response of relay 13 the contacts $13^b$ thereof close and the winding $13^d$ of said relay 13 is then connected across the mains $l^1$—$l^2$ of the large generating unit 2 through the medium of auxiliary contacts $11^c$ of transfer switch 11. Also upon response of relay 13 relay winding $11^a$ is connected across mains $l^1$—$l^2$ of the large generator unit through the medium of contacts $13^b$ and relay 15 while relay winding $10^a$ is connected across said mains through the medium of contacts $13^b$, relay 15 and auxiliary contacts $12^b$ associated with equalizing switch 12. Relay windings $10^a$ and $11^a$ are of relatively high resistance and relay winding $13^d$ is of relatively low resistance and the latter winding acts as a load across the mains of the large generator unit 2 to effect starting of said unit, as described in connection with Fig. 2. When the voltage across the mains $l^1$—$l^2$ of the large generator unit 2 reaches a predetermined value the windings $10^a$ and $11^a$ effect response of their respective switches. Transfer switch 10 in responding disconnects the small generator unit 1 from the service mains $L^1$—$L^2$ and transfer switch 11 in responding connects the larger unit to said mains. Upon disconnection of the small generator unit 1 from the service mains $L^1$—$L^2$ the same stops as set forth in connection with Fig. 2 and the load across the service mains $L^1$—$L^2$ is now supplied with current by the large generator unit 2.

In connection with the foregoing it should be noted that upon opening of switch 10 the winding $13^c$ of relay 13 is deenergized. However, during closure of switch 11 relay 13 is held in its operated position by its winding $13^d$ which is energized as hereinbefore described. Following closure of transfer switch 11 the auxiliary contacts $11^c$ thereof open to deenergize the winding $13^d$ but in the meantime the winding $13^c$ of relay 13 is energized by current supplied to the load through switch 11 and said relay is thus held in its operated position.

Assuming now that the load across the service mains $L^1$—$L^2$ exceeds the capacity of the large generator unit 2, the winding $14^a$ then effects response of relay 14. Relay 14 in closing connects the operating winding $12^a$ of equalizing switch 12 across the mains $l^1$—$l^2$ of the small generator unit and also connects a resistance $r^2$ across said mains through the medium of auxiliary contacts $10^b$ of transfer switch 10. Resistance $r^2$ and relay coil $12^a$ then act as a load on the small generator unit to effect starting thereof as set forth in connection with Fig. 2. When the voltage of the small generator unit 1 reaches a given value winding $12^a$ effects response of equalizing switch 12 and as shown in Fig. 2 switch 12 in closing establishes a connection between the right hand terminal of armature A of unit 1 and the left hand terminal of armature A of unit 2. As is well known, such connection provides for equalization of the terminal voltage of the two generators 1 and 2. Following closure of switch 12 the auxiliary contacts $12^b$ thereof open to interrupt the aforedescribed energizing circuit for the coil $10^a$ of transfer switch 10. Transfer switch 10 then returns to normal position to connect the generator of the small unit 1 in parallel with the generator of the large unit 2. The load across the service mains $L^1$—$L^2$ is then supplied by both generators. Upon return of switch 10 to normal position the auxiliary contacts $10^b$ thereof disconnect resistance $r^2$ from the mains $l^1$—$l^2$ of the small generator unit 1.

Assume now that the load across the service mains $L^1$—$L^2$ decreases to a value which is within the capacity of the large generator unit 2. Winding $14^a$ then permits relay 14 to return to normal position. This results in deenergization of equalizing switch 12 and said switch in returning to normal position interrupts the aforedescribed equalizing connection between the generators of the units and the auxiliary contacts $12^b$ thereof again establish the aforedescribed energizing circuit for the coil $10^a$ of transfer switch 10. Transfer switch 10 then responds to disconnect the small generator unit 1 from the service mains $L^1$—$L^2$ and said unit is stopped as described in connection with Fig. 2.

Upon a further decrease in load to a value within the capacity of the small generator unit 1 winding $13^c$ permits relay 13 to return to normal position and the operating windings $10^a$ and $11^a$ of the transfer switches are then maintained energized through the auxiliary contacts $11^b$ of the latter transfer switch. Also upon return of relay 13 to normal position the contacts $13^a$ thereof connect the winding $16^a$ of relay 16 across mains $l^1$—$l^2$ of the large generator unit 2 through the medium of the auxiliary contacts $11^b$ of transfer switch 11. Relay 16 then responds to connect a resistance $r^3$ and the coil $15^a$ of relay 15 across the mains $l^1$—$l^2$ of the small generator unit 1. Resistance $r^3$ and coil $15^a$ act as a load across the mains and the small generator unit 1 to effect starting thereof in the manner hereinbefore set forth. When the voltage of the small generator unit 1 reaches a given value winding $15^a$ effects response of relay 15 to interrupt the aforedescribed energizing circuit for coils $10^a$ and $11^a$ of the transfer switches 10 and 11. Transfer switch 11 thus opens to disconnect the service mains $L^1$—$L^2$ from the mains $l^1$—$l^2$ of the large generator unit 2 and switch 10 in returning to normal position connects said service mains to the mains $l^1$—$l^2$ of the small generator unit 1. Upon opening of switch 11 the auxiliary contacts 11ᵇ thereof interrupt the aforedescribed energizing circuit for relay 16 and said relay in returning to normal position disconnects the winding 15ᵃ of relay 15 and resistance $r^3$ from the mains of the small generator unit 1. Under no load conditions the small generator unit 1 is stopped as hereinbefore set forth.

When knife switch 17 is moved into its left hand position the small generator unit 1 is rendered inoperative since the service main $L^2$ is then connected to main $l^2$ of the large generator unit 2. However, as is apparent from the description in connection with Fig. 2 the large generator unit 2 is then operative to supply current to the service mains $L^1$—$L^2$ upon connection of a load across the same.

What I claim as new and desire to secure by Letters Patent is:

1. In a system of electrical distribution, in combination, two generating units of different capacities, a single load circuit to be supplied thereby and means responsive to load conditions in said circuit for controlling said units to selectively render one or the other of the same operative to supply current to said load circuit under different predetermined load conditions, and to render both of said units operative to supply current to said load circuit under other predetermined load conditions.

2. In a system of electrical distribution, in combination, two generating units of different capacities, a single load circuit to be supplied thereby, separate means for automatically starting each of said units upon a current demand across the mains thereof, and means responsive to current conditions in said load circuit for selectively rendering one or the other of said units operative to supply current to said load circuit under different predetermined load conditions and to render both of said units operative to supply current to said load circuit under other predetermined load conditions.

3. In a system of electrical distribution, in combination, two gas-engine-operated generating units of different capacities, a common load circuit therefor normally connected to the smaller of said units, means for starting each of said units upon current demand across the mains thereof, and means associated with said former means to render the larger of said units operative alone to supply current to said load circuit under given load conditions, and to render both of said units operative to supply current to said load circuit under other load conditions.

4. In a system of electrical distribution, in combination, two gas-engine-operated generating units of different capacities, a common load circuit therefor, means responsive to load conditions in said circuit for selectively rendering one or the other of said generating units operative upon different predetermined load conditions in said circuit, means associated with said former means to effect parallel operation of said units under other predetermined load conditions in said circuit and means for equalizing the terminal voltage of said units upon operation thereof in parallel.

5. In a system of electrical distribution, in combination, two gas-engine-operated generating units of different capacities, a common load circuit to be supplied thereby, an automatic controller associated with each of said units to effect starting thereof upon current demand across the mains thereof, means associated with said controllers to render the smaller of said units operative to supply current to said load circuit when the current demand is within the capacity of the smaller of said units, and for rendering said smaller unit inoperative and the larger of said units operative to supply current to said load circuit when the current demand exceeds the capacity of said smaller unit but is within the capacity of said larger unit, and means associated with said controllers for rendering both of said units operative to supply current to said load circuit when the current demand exceeds the capacity of the larger of said units.

In witness whereof, I have hereunto subscribed my name.

EDWIN W. SEEGER.

CERTIFICATE OF CORRECTION.

Patent No. 1,851,989. April 5, 1932.

EDWIN W. SEEGER.

It is hereby certified that error appears in the printed specification of the above numbered patent requiring correction as follows: Page 4, lines 67 and 68, claim 4, strike out the words "means associated with said former means" and insert the word and; and that the said Letters Patent should be read with this correction therein that the same may conform to the record of the case in the Patent Office.

Signed and sealed this 12th day of July, A. D. 1932.

(Seal)

M. J. Moore,
Acting Commissioner of Patents.